US009026663B2

(12) United States Patent
Mutikainen et al.

(10) Patent No.: US 9,026,663 B2
(45) Date of Patent: May 5, 2015

(54) METHOD, APPARATUS AND PROGRAM PRODUCT FOR MERGING COMMUNICATION SESSIONS IN AN IMS

(75) Inventors: Jari Mutikainen, Lepsämä (FI); Miikka Juhana Poikselka, Espoo (FI)

(73) Assignee: Cellular Communications Equipment LLC, Plano, TX (US)

( * ) Notice: Subject to any disclaimer, the term of this patent is extended or adjusted under 35 U.S.C. 154(b) by 447 days.

(21) Appl. No.: 12/742,102

(22) PCT Filed: Oct. 30, 2008

(86) PCT No.: PCT/EP2008/064698
§ 371 (c)(1),
(2), (4) Date: May 10, 2010

(87) PCT Pub. No.: WO2009/062849
PCT Pub. Date: May 22, 2009

(65) Prior Publication Data
US 2010/0257273 A1    Oct. 7, 2010

(30) Foreign Application Priority Data

Nov. 13, 2007    (EP) .................................... 07022036

(51) Int. Cl.
*H04L 29/08* (2006.01)
*H04L 29/06* (2006.01)
(Continued)

(52) U.S. Cl.
CPC ................. *H04L 67/14* (2013.01); *H04L 12/66* (2013.01); *H04L 29/12764* (2013.01); *H04L 65/1086* (2013.01); *H04L 67/146* (2013.01); *H04L 67/148* (2013.01)

(58) Field of Classification Search
CPC ... G06F 15/16; H04L 29/12764; H04L 12/66; H04L 67/14
USPC .......................................... 709/227; 370/356
See application file for complete search history.

(56) References Cited

U.S. PATENT DOCUMENTS 6,092,111 A *   7/2000   Scivier et al. ................. 709/227
7,145,994 B2 * 12/2006   Moreau et al. ........... 379/114.01
(Continued)

FOREIGN PATENT DOCUMENTS

CN      101035251 (A)      9/2007
WO      WO 2006/010526 A1  2/2006
(Continued)

OTHER PUBLICATIONS

Loreto et al., "The Session Initiation Protocol (SIP) Same-Session Header Field", Feb. 2006.*
(Continued)

*Primary Examiner* — O. C. Vostal
(74) *Attorney, Agent, or Firm* — Procopio, Cory, Hargreaves & Savitch LLP

(57) ABSTRACT

The present invention relates to a session merging entity in a communication system IMS. The merging entity is handling communication of the first user; the communication includes a first session and a second session. The first session and the second session are merged into a single session towards the second user, if the same IMS communication service identifier has been indicated for the first session and the second session. The merging entity may also be located at the terminal device of the second user.

27 Claims, 3 Drawing Sheets

(51) Int. Cl.
*H04L 12/66* (2006.01)
*H04L 29/12* (2006.01)

(56) References Cited

U.S. PATENT DOCUMENTS

| | | | |
|---|---|---|---|
| 7,979,062 B2* | 7/2011 | Cotevino et al. | 455/418 |
| 8,081,958 B2* | 12/2011 | Soderstorm et al. | 455/416 |
| 2003/0083938 A1* | 5/2003 | Smith et al. | 705/14 |
| 2004/0199580 A1* | 10/2004 | Zhakov et al. | 709/204 |
| 2005/0034079 A1* | 2/2005 | Gunasekar et al. | 715/753 |
| 2005/0152275 A1* | 7/2005 | Laurila et al. | 370/241 |
| 2006/0035656 A1* | 2/2006 | Sung et al. | 455/518 |
| 2006/0114847 A1* | 6/2006 | Dssouli et al. | 370/261 |
| 2006/0155857 A1* | 7/2006 | Feenan et al. | 709/227 |
| 2006/0212583 A1* | 9/2006 | Beadle et al. | 709/227 |
| 2006/0221829 A1* | 10/2006 | Holmstrom et al. | 370/230 |
| 2006/0291412 A1* | 12/2006 | Naqvi et al. | 370/328 |
| 2007/0036312 A1* | 2/2007 | Cai et al. | 379/126 |
| 2007/0168523 A1* | 7/2007 | Jiang et al. | 709/228 |
| 2007/0263615 A1* | 11/2007 | Zhu et al. | 370/356 |
| 2008/0065548 A1* | 3/2008 | Muijen | 705/51 |
| 2008/0132215 A1* | 6/2008 | Soderstrom et al. | 455/416 |
| 2008/0219250 A1* | 9/2008 | Mutikainen et al. | 370/389 |
| 2008/0239996 A1* | 10/2008 | Lohmar et al. | 370/261 |
| 2008/0254816 A1* | 10/2008 | Sun et al. | 455/466 |
| 2008/0285464 A1* | 11/2008 | Katzir | 370/241 |
| 2008/0311917 A1* | 12/2008 | Marathe et al. | 455/445 |
| 2009/0040925 A1* | 2/2009 | Holmstrom et al. | 370/230 |
| 2009/0094369 A1* | 4/2009 | Wooldridge et al. | 709/228 |
| 2009/0215486 A1* | 8/2009 | Batni et al. | 455/550.1 |
| 2009/0225760 A1* | 9/2009 | Foti | 370/400 |
| 2009/0257433 A1* | 10/2009 | Mutikainen et al. | 370/392 |
| 2010/0020790 A1* | 1/2010 | Pallares Lopez et al. | 370/352 |
| 2010/0037161 A1* | 2/2010 | Stading et al. | 715/764 |
| 2010/0110978 A1* | 5/2010 | Falkena et al. | 370/328 |
| 2010/0182955 A1* | 7/2010 | Bjork et al. | 370/328 |
| 2010/0185772 A1* | 7/2010 | Wang et al. | 709/227 |
| 2010/0254372 A1* | 10/2010 | Keller et al. | 370/352 |
| 2011/0128907 A1* | 6/2011 | Kvernvik | 370/328 |
| 2011/0134913 A1* | 6/2011 | Astrom et al. | 370/352 |
| 2011/0161248 A1* | 6/2011 | Cai et al. | 705/400 |

FOREIGN PATENT DOCUMENTS

WO    WO 2008080297 A1 *   7/2008
WO    WO 2010017834 A1 *   2/2010

OTHER PUBLICATIONS

Rosenberg et al., "SIP: Session Initiation Procotol", RFC 3261, Jun. 2002.*
Worley et al., "The References Header for SIP", Apr. 2012.*
Keller, U.S. Appl. No. 60/944,581 specification, "3GPP TSG WG2 Architecture", Jun. 2007.*
Keller provisional, 3GPP, "3GPP TR 23.892 v0.5.6 (May 2007)", "3rd Generation Partnership Project; Technical Specification Group Services and System Aspects; IP Multimedia System (IMS) services (Release 8)", May 2007, filed as Keller U.S. Appl. No. 60/944,581.*
Rosenberg et al., "SIP: Session Initiation Protocol", RFC 3261, 2002.*
Campbell et al., "The Message Session Relay Protocol (MSRP)", RFC 4975, 2007.*
Tomic et al., "SIP meets ZigBee", 2007.*
Gourraud, "Using IMS as a Service Framework", 2007.*
Buono et al., "A Distributed IMS Enabled Conferencing Architecture on Top of a Standard Centralized Conferencing Framework", 2007.*
Chatras et al., "Delivering Quadruple Play with IPTV over IMS", 2007.*
Johnston et al., "Session Initiation Protocol (SIP) Call Control—Conferencing for User Agents", RFC 4579, 2006.*
Qualcomm Europe, "Information flows for combined PS and CS origination and termination", 3GPP TSG SA WG2 Meeting #61, Ljubljana, Slovenia, Nov. 12-16, 2007, 3 pgs.
ETSI TS 123 279, V7.7.0 (Oct. 2007), Digital cellular telecommunications systems (Phase 2+); Universal Mobile Telecommunications Systems (UTMS); Combining Circuit Switched (CS) and IP Multimedia Subsystem (IMS) services; Stage 2 (3GPP TS 23.279 V7.7.0, Release 7), 38 pgs.
ETSI TS 123 228, V7.9.0 (Oct. 2007), digital cellular telecommunications system (Phase 2+); Universal Mobile Telecommunications Systems (UTMS); IP Multimedia Subsystem (IMS); Stage 2 (3GPP TS 23.228 V7.9.0 Release 7), 228 pgs.

* cited by examiner

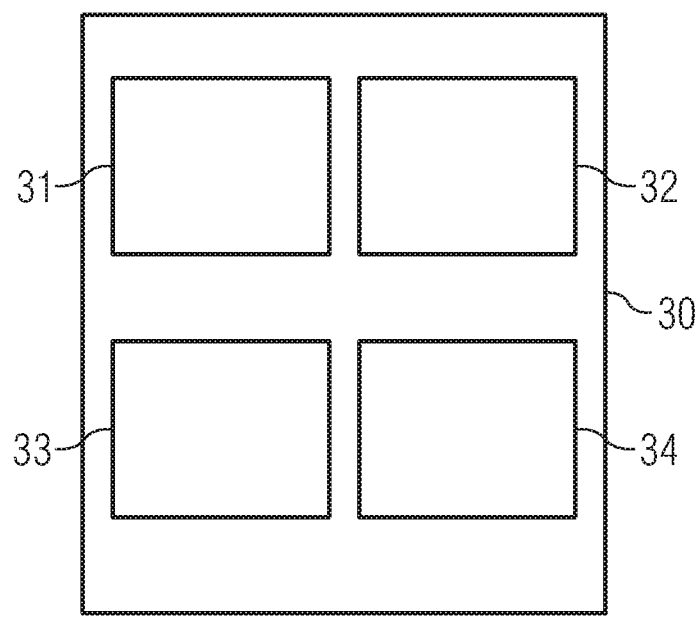

METHOD, APPARATUS AND PROGRAM PRODUCT FOR MERGING COMMUNICATION SESSIONS IN AN IMS

TECHNICAL FIELD OF THE INVENTION

The invention relates to a network entity, user equipment and a method for merging plurality of communication sessions from a first user into a single session towards a second user.

BACKGROUND OF THE INVENTION

Within the IP (Internet Protocol) Multimedia Subsystem (IMS) as defined by $3^{rd}$ Generation Partnership Project (3GPP) Session Initiation Protocol (SIP) defined by Internet Engineering Task Force (IETF) is used for controlling communication. SIP is an application-layer control protocol for creating, modifying, and terminating sessions with one or more participants. These sessions may include Internet multimedia conferences, Internet telephone calls, and multimedia distribution. Members in a session can communicate via multicast or via a mesh of unicast relations, or a combination of these.

Different types network entities and functions exist in the IMS network. Call Session Control Functions (CSCF) implement a session control function in SIP layer. The CSCF can act as Proxy CSCF (P-CSCF), Serving CSCF (S-CSCF) or Interrogating CSCF (I-CSCF). The P-CSCF is the first contact point for the User Equipment (UE) within the IMS; the S-CSCF actually handles the session states in the network; the I-CSCF is mainly the contact point within an operator's network for all IMS connections destined to a subscriber of that network operator, or a roaming subscriber currently located within that network operator's service area.

The functions performed by the I-CSCF are, for example, assigning an S-CSCF to a user performing SIP registration and routing SIP requests received from another network towards the S-CSCF. The S-CSCF performs the session control services for the UE. It maintains a session state as needed by the network operator for support of the services and may be acting as Registrar, i.e. it accepts registration requests and makes its information available through the location server (e.g. HSS). The S-CSCF is the central point to users that are hosted by this S-CSCF. The S-CSCF provides services to registered and unregistered users when it is assigned to these users. This assignment is stored in the Home Subscriber Server (HSS).

An Application Server (AS) is offering value added IP multimedia (IM) services to users of the IMS network and resides either in the IMS user's home network or in a third party location. The third party could be a network or simply a stand-alone AS. The AS may host and execute various services and can influence and impact a SIP session on behalf of the services. The IP multimedia Subsystem Service Control Interface (ISC) interface is between the S-CSCF and the service platforms (i.e. Ass). The ISC interface offers extended services to subscribers. ASs that are connected to the IMS are controlled via ISC interface. The protocol used on the ISC interface is the SIP.

A media gateway control function (MGCF) acts as an interworking point between a circuit switched (CS) network and an IP network in the control plane of the network. The MGCF controls the parts of the call state related to connection control for media channels in a media gateway (MGW), communicates with call state control, and performs protocol conversion between the call control protocols, such as SIP and ISUP.

Telephony Application Server (TAS) is a SIP-AS providing the network support for multimedia telephony services. Such services may include call forwarding, call transfer, conference call, call hold and other well known services from traditional circuit switched telephone networks.

The 3GPP is specifying multimedia session continuity (MMSC) which defines procedures for session continuity using SIP mechanisms. The MMSC is to include procedures where the UE moves from first access technology to second access technology, e.g. from wireless local area network (WLAN) to universal terrestrial radio access network (UTRAN), and the complete SIP session or part of the media components in the session continues seamlessly in the new access. Similar procedures should work also conjunction with voice call continuity (VCC), i.e. where the voice session is transferred from/to CS domain using VCC, but the SIP session is transferred using MMSC procedures. Also it should cover procedures where the sessions or media components in the session are transferred between multiple devices.

A session split/merge application server (AS) is a network entity responsible to represent a single SIP session towards the other end, even if the UE needs to use separate sessions in his end. The split/merge AS is also responsible to split and merge the session on fly in middle of the access transfer procedure. For example, if the UE is engaged in a SIP session in WLAN that includes voice over IP (VoIP) speech component and video sharing media, and the UE then moves from WLAN access to UTRAN access where VoIP is not possible or preferred, the UE should perform VCC procedure for the speech media, in order to transfer the speech to CS over UTRAN and transfer the video sharing SIP session to packet switched (PS) over UTRAN. The role of the split/merge AS in this scenario is to combine the speech and video sharing sessions after the access transfer and hide the session split from the UE in the other end. In other words, the UE in the other end may receive media updates (e.g. SIP re-INVITE requests) due to the access transfer, but the other end should not realize that the session has been split into two due to access transfer.

The split/merge AS should merge together the speech sessions it receives via MGCF, and SIP sessions it receives via P-CSCF, S-CSCF and present them as a single session towards the other end. The problem is that the split/merge AS should not merge the sessions that belong to different services. Otherwise the network is not able to route the sessions correctly to proper servers.

The object of the invention is to overcome the above problems.

SUMMARY OF THE INVENTION

The present invention overcomes the above problem by providing session handling entity, a method and a computer program, comprising:
  handling communication of a first user, the communication comprising a first session and a second session, and
  handling the communication of the first session and the second session of the first user towards a second user and arranged to merge the first session and the second session into a single session towards the second user, if the same communication service identifier has been indicated for the first session and the second session. The communication may be handled using Session Initiation Protocol (SIP).

Merging the first session and the second session may comprise re-negotiating an ongoing session to wards the second user.

During establishment of the second session, it may the determined that the session handling entity already maintains the ongoing session for the first user towards the second user, and the merging may comprise merging the second session into the ongoing session in response to the establishment of the second session. The ongoing session towards the second user may comprise media of the first session and the merging may add media of second session into the ongoing session.

The re-negotiation of the ongoing session may comprise transmitting a re-INVITE or an UPDATE request of Session Initiation Protocol (SIP).

The communication service identifier may comprise an IMS Communication Service Identifier (ICSI) or an IMS Application Reference Identifier (IARI) or an Open Mobile Alliance feature tag. The IMS Communication Service Identifier may is indicate IMS Multimedia Telephony service (MMtel).

The session handling entity may be implemented in a multimedia session continuity application server (MMSC AS), a session split and merge function (SSMF) an IMS centralized services application server (ICS AS) or an session initiation protocol application server.

The first session and the second session may carry different media types. The media types may be either speech, video, instant messaging, push-to-talk, file transfer or image sharing or other media.

The merging multimedia sessions may comprise
controlling communication of a first user, the communication comprising a first session and a second session;
determining if communication service identifiers are indicated for the first session and for the second session, and if the communication service identifiers for the first session and the second session are the same, merging the first session and the second session into a single session towards a second user.

The session handling entity may be implemented at a terminal device of the second user and the handling the communication towards the second user may comprise representing the merged sessions as a single application to the second user, if the first session and the second session are merged into the single session towards the second user.

The present invention has the advantage that it provides logic to merge sessions at the IMS network so as to continue the communication towards the other party in a single session, i.e. without the other party has to involve a new session. The invention defines the conditions when a session can be merged into an ongoing session and when this cannot be done. The merge logic should not merge the sessions that belong to different services, otherwise the problem would be that the network cannot route the sessions correctly to proper servers.

DESCRIPTION OF DRAWINGS

FIG. 3 illustrates the internal structure and functions of the split/merge AS.

DETAILED DESCRIPTION OF THE INVENTION

Figure 1:
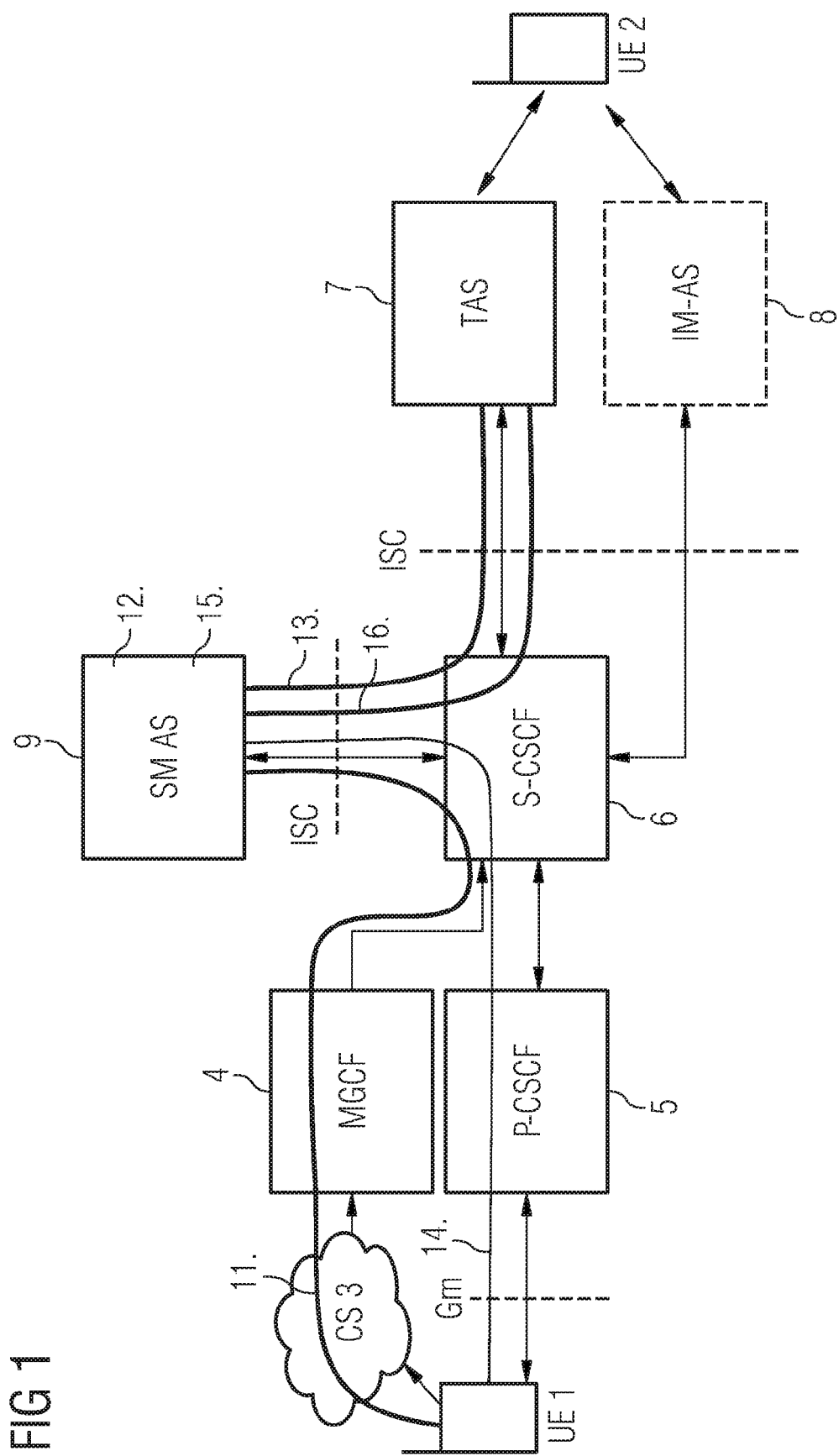
FIG. 1 illustrates an embodiment of the invention in which the split/merge AS decides to merge two sessions.

The 3GPP communication service identity framework defines an IMS Communication Service Identifier (ICSI) that may be used to indicate the requested service in the initial request of the IMS session. The ICSI is presented as Uniform Resource Name (URN). URN is a Uniform Resource Identifier (URI) that uses so-called urn scheme, and does not imply availability of the identified resource.

IMS Multimedia Telephony service (MMtel) is an example service that is having ICSI value. URN used to define the ICSI for the IMS Mutimedia Telephony Communication Service:
urn:urn-xxx:3gpp-service.ims.icsi.mmtel.

MMtel URN may be used to indicate that the device supports the IMS Multimedia Telephony Communication Service.

The network part of the MMtel service is implemented in a Telephony Application Server (TAS). An MMtel session may consist of multiple media components, for example audio, video, messaging (e.g. using messaging session relay protocol, MSRP), file transfer, image sharing, etc. All IMS sessions that include the ICSI value for MMtel should be routed to the TAS in order to execute the MMtel service in proper manner. Also public switched telephone network (PSTN) or CS network originated sessions shall be considered as an MMtel session which includes only audio as a media component, or both audio and video in case of a CS video telephony. For PSTN or CS network originated sessions an originating-MGCF includes the ICSI value for MMtel for sessions it initiates.

Open Mobile Alliance (OMA) has defined IMS services, for example instant messaging (IM), which consist of similar media than MMtel, except voice and video. OMA-IM does not use the ICSI framework, but has defined similar mechanism to identify the IM sessions. For this purpose OMA uses a dedicated feature tag. Also OMA-IM has a network server (IM AS) which implements the network part of the service and where the IM sessions need to be routed.

Multimedia session transfer is a transfer at the IMS-level of one or more of the session signalling paths and associated media paths of an ongoing multimedia session while maintaining session continuity. The multimedia session transfer incorporates both access network trans-fer and UE transfer. Multimedia session continuity is service of the IMS which supports the use of multimedia session transfer mechanisms in order to handle terminal mobility events and/or mobility between UEs for the case when such events are not hidden from the IMS session layer and thus session continuity could not otherwise be maintained. Access network transfer is a transfer at the IMS-level of both the signalling path and media path of an ongoing multimedia session on a UE from PS to CS domain or vice versa or between different IP connectivity access networks (IP-CAN).

In general, the continuity of multimedia services refers to the capability of continuing ongoing communication sessions with multiple media across different access networks or across different user equipments (UEs). The main need for such continuity arises because (i) UEs with multimedia capabilities can move across a multiplicity of different access networks or because (ii) the users can move the media of their communication sessions across different UEs to best meet their communication preferences. Transfer of a multimedia session to a different access network may lead to loss of synchronization across various media components (e.g. across voice and video components). The session continuity solution may take such synchronization issues into account for assuring the best user experience.

For the scenario of PS-PS multimedia session continuity:
All or some ongoing media components in the source access network are transferred to the target access network. If it is not possible or not desired (e.g. due to operator policies) to transfer all media, then part of the media components are transferred and the remaining component(s) are either released or kept. For example it may not be possible to transfer some media components to the target access network due to limited target access network capabilities. The selection of media to be transferred may depend on the solution used to realize the session transfer If possible and if allowed (e.g. by user preferences and/or operator policies) some media components may remain in the source access network.

The source and the target access network can include both 3GPP IP access systems and non-3GPP IP access systems (e.g. WiMAX).

After the UE hands over to the target access network the same or a different P-CSCF may be used. The solution for PS-PS multimedia session continuity should cope with both cases.

The PS-PS session continuity in conjunction with PS-CS continuity refers to a particular case of multimedia session continuity in which a session with media on both the CS domain and the PS domain is transferred to an access network supporting only packet switched (PS) communications, or vice versa. The transfer of the session is required due to user's movement from one access network (source) to another access network (target). The typical characteristic of this case is that one access network supports real-time media (usually voice) only on the CS domain (e.g. GERAN or UTRAN) whereas the other access network supports both real-time media and non-real-time media on PS bearers (e.g. E-UTRAN, WiMAX, or WLAN). To maintain a high-quality of user experience, the session is transferred to and continued on the target access network as seamlessly as possible.

For the scenario of PS-PS session continuity in conjunction with PS-CS continuity the following behavior may be relevant:

One access network (either the source or the target) supports voice on the CS domain only (such as UTRAN or GERAN), while the other access network supports voice and non-voice components on IP transport bearers (such as WLAN, WiMAX or E-UTRAN).

If the target access network supports voice on the CS domain only, then a voice component may be transferred to the CS domain and drop the remaining non-voice component(s).

If possible and if allowed (e.g. by user preferences and/or operator policies) some non-voice media components may remain in the source access network.

If the target access network supports video on the CS domain, then voice and video components may be transferred to the CS domain and all other components can be transferred to the PS domain.

If the target access network supports all media on IP transport bearers, then all media components active in the CS and PS domain of the source network may be transferred to IP transport bearers.

The invention proposes the split/merge AS to use ICSI for making a decision whether sessions are to be merged or not.

Therefore logic in the split/merge AS is introduced to determine an ICSI value in a received session, and if the ICSI matches to the ICSI in the existing session between the same users, then the decision is made to merge the sessions, otherwise the sessions are not merged.

Example scenarios are presented in following figures.

FIG. 1 presents a scenario where a UE 1 initiates, in signal 11, a circuit switched (CS) call towards the other end (e.g. UE 2) through a CS network 3. An S-CSCF 6 executes initial filter criteria (iFC) and a session split and merge application server (SM-AS 9) is allocated to the session path. The session path traverses the CS network 3 and an MGCF 4 to the split/merge AS 9 over ISC interface. However, it is to be noted that other ways exist to route a session setup from the UE 1 to the split/merge AS 9. For example, the session setup may pass through the MGCF 4 and an I-CSCF (not shown in the figure), instead of the S-CSCF 6. In step 12, the split/merge AS 9 determines that the session includes ICSI with value MMTel. In signal 13 the split/merge AS 9 passes the session further back to S-CSCF 6. The S-CSCF 6 continues iFC execution and the session is routed to TAS 7, which executes the actual service logic for multimedia telephony service. Later on during the voice call, in signal 14, the UE 1 initiates a video sharing session with the same other end (UE 2). UE 1 includes ICSI with value MMTel for the session. The session is routed through a P-CSCF 5 to the S-CSCF 6. The S-CSCF 6 executes the iFC and the session is routed to the split/merge AS 9. In step 15 the split/merge AS 9 determines that it maintains an existing session with the same participants (UE 1 and UE 2), and that the ICSI values of the existing session and the new (video sharing) session are equal. Thus split/merge AS 9 considers that the sessions belong together, and in signal 16, the split/merge AS 9 sends a re-INVITE towards the other end (UE 2). The re-INVITE is routed to S-CSCF 6 which then follows the existing path for the session, and routes the re-INVITE to the TAS 7. The TAS 7 executes the actual service for MMTel.

Figure 2:
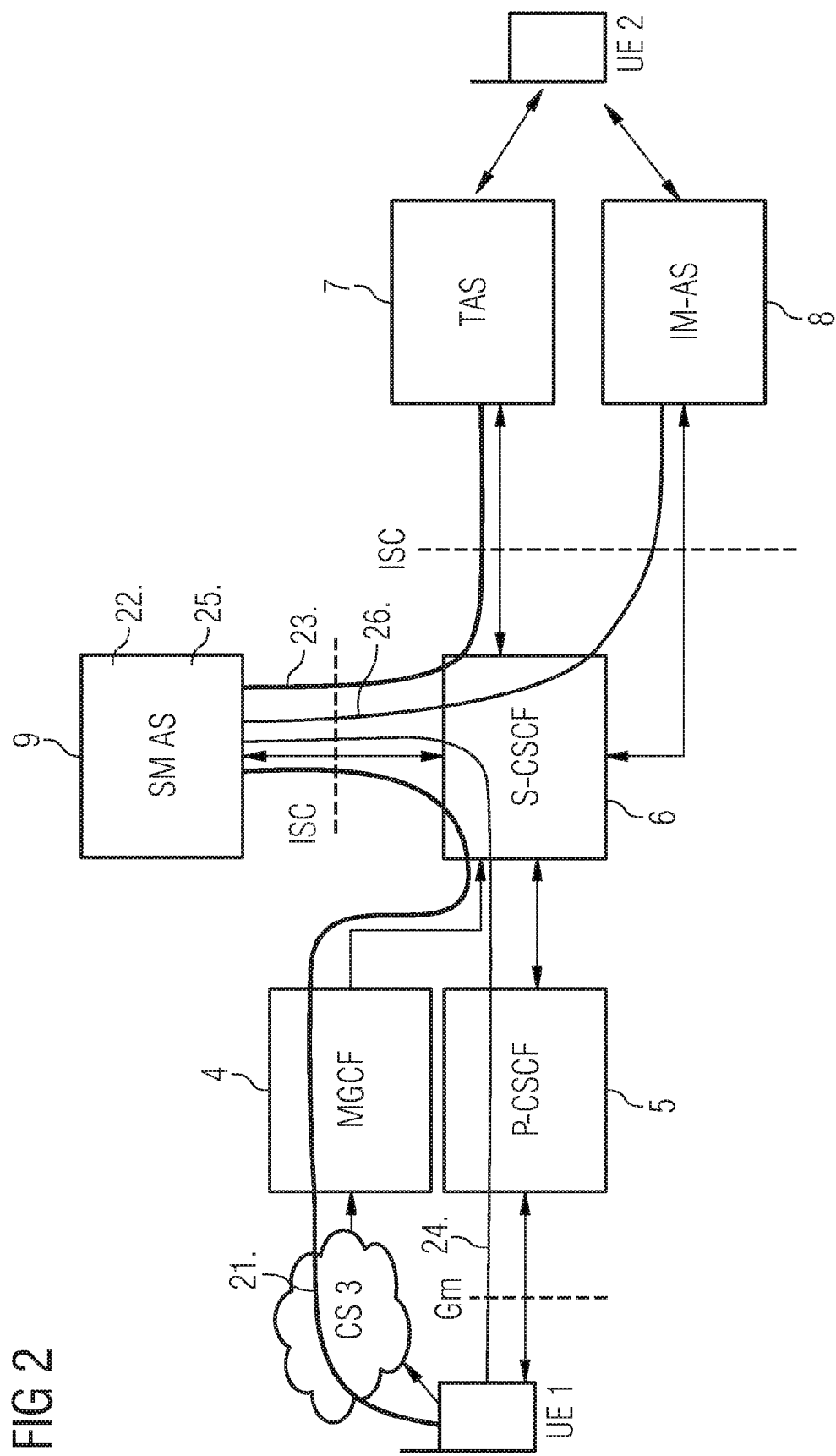
FIG. 2 presents an aspect of the invention in which the split/merge AS decides to keep two session separated.

FIG. 2 presents a scenario where the UE 1 initiates, in signal 21, a CS call towards the other end (UE 2). An S-CSCF 6 executes the iFC and an split/merge AS 9 is allocated to the session path. In step 22, the split/merge AS 9 determines that the session includes ICSI with value MMTel. In signal 23 the split/merge AS 9 passes the session further back to S-CSCF 6. The S-CSCF 6 continues iFC execution and the session is routed to a TAS 7, which executes the actual service logic for multimedia telephony service. Until this point the description of FIG. 2 corresponds to the description of FIG. 1. Later on during the voice call, in signal 24, the UE 1 initiates a file transfer session (difference to FIG. 1) with the same other end (UE 2). The UE 1 does not include ICSI value, but includes OMA IM indicator instead. The session is routed to the S-CSCF 6. The S-CSCF 6 executes the iFC and the session is routed to the split/merge AS 9. In step 25, the split/merge AS 9 determines that it maintains an existing session with the same participants (UE 1, UE 2), but that the ICSI values are different. In other words, the new request 24 does not include ICSI with value MMTel, but OMA IM indicator instead. The OMA IM indicator may replace ICSI in the same field. Thus the split/merge AS 9 considers the sessions do not belong together, and in signal 26 generates a new INVITE towards the other end (UE 2). The INVITE is routed to S-CSCF 6 which then executes the iFC for the new session and routes the INVITE to an OMA-IM AS 8. The IM-AS executes the actual service for OMA-IM service.

Thus, by determining the same ICSI for both sessions between the same endpoints the split/merge AS decides that the sessions can be merged towards the other end. If the ICSI values do not match, or one of the sessions does not have ICSI value (but instead may include e.g. OMA feature tag for identifying the service), the sessions are not merged.

In one aspect of the invention the sessions of a first user are to be merged towards a second user based on matching OMA feature tags indicating the same service.

In one aspect of the invention, a split/merge AS merges the sessions only if ICSI with value MMTel has been indicated for both sessions of the first user, i.e. for other matching ICSI (or OMA feature tag) values the sessions are not merged.

In one aspect of the invention and IMS Application Reference Identifier (IARI) values of the sessions of a first user are compared in a similar way as ICSI values above. The IARI is coded as a URN. The IARI URN may be included as a quoted string as a value of the
g.ims.app_ref media feature tag. An example of a
g.ims.app_ref media feature tag containing an IARI is:
g.ims.app_ref="<urn:urn-xxx:
telephony.3gpp.mmtelapplication-v1>"

In this aspect of the invention sessions of a first user are to be merged towards a second user based on matching IARI values.

FIG. 3 presents the internal structure and functions of the network entity 30 implementing the session merge function, such as split/merge AS 9. The network entity 30 comprises a first session handling unit 31 configured to handle SIP sessions of a first user participating the communication. A second session unit 32 is configured to handle SIP sessions towards a second user participating the communication. The second session unit 32 is arranged to merge a session(s) handled by the first session unit 31 into a single session towards the second user. A determination unit 33 is configured to determine if an ICSI is indicated for a session handled by the first session handling unit 31. The ICSI may be present in a received SIP request. If the ICSI is detected the determination unit 33 is also configured to recognize the ICSI value. The network entity 30 comprises a maintaining unit 34 configured to maintain information about ongoing sessions in the network entity 30, participants of the sessions and possible ICSI values determined for the sessions. During establishing a new session, the determination unit 33 determines a possible ICSI value for the new session. If such is found, the maintaining unit 34 checks if there already exists an ongoing session with the same participants (i.e. users) and with the same ICSI value. If such a session is found, the second session unit 32 is merging the new session into the ongoing session towards the second user, i.e. towards the party from whose side the new request did not arrive. The second session unit 32 may merge the session by transmitting a SIP re-INVITE or a SIP UPDATE request which modifies the ongoing session by adding media components of the new session to the ongoing session. The determination unit 33 and maintaining unit 34 may detect, recognize and compare also OMA feature tags identifying OMA services or IARI values and order a session merge based on matching OMA feature tags or IARI values. The units described above may be implemented e.g using microprocessors and/or other electrical components and/or by software.

In one aspect of the invention, similar split/merge logic is implemented at user equipment (UE). The UE is having more than one ongoing SIP sessions towards the network, but based on matching ICSI, IARI or OMA feature tag values the UE may merge two or more of the session into a single session towards the user. The (end) user sees the merged session as a single application. This aspect has the benefit that even if the terminal device of the second user (e.g. UE 2 in FIG. 1) receives two sessions in signaling level, only one application is visible to the end user of the device (UE 2). The terminal device (UE 2) may merge the sessions internally even if the network does not support merge/split logic.

The invention is not limited to IMS networks, but may also be applied in other networks having similar session splitting and merging entity role as split/merge AS and in which networks various medias are used for communication. Therefore, the split/merge AS is only used here as an example of an entity responsible for handling session merging. A Session Split and Merge Function (SSMF), a Multimedia Session Continuity Application Server (MMSC AS) and an IMS Centralized Services Application Server (ICS AS) are further examples of network nodes which may implement session splitting and merging operations according to this invention. Functions of the split/merge AS described above may be implemented by code means, as software, and loaded into memory of a computer.

The invention claimed is:

1. A method, comprising:
controlling, with a network entity, communication of a first user, the communication comprising a first session and a second session;
determining, with the network entity, if communication service identifiers comprising an internet protocol multimedia subsystem communication service identifier are indicated for the first session and for the second session, wherein, if the internet protocol multimedia subsystem communication service identifiers for the first session and the second session match, merging the first session and the second session into an ongoing session towards a second user.

2. The method of claim 1, wherein controlling the communication of the first user comprises using session initiation protocol.

3. The method of claim 1, wherein the single session towards the second user is controlled using session initiation protocol.

4. The method of claim 1, wherein the merging the first session and . the second session into the ongoing session comprises re-negotiating the ongoing session.

5. The method of claim 1, further comprising determining, during establishment of the second session, existence of the ongoing session of the first user towards the second user, and wherein the merging comprises merging the second session into the ongoing session in response to the establishment of the second session.

6. The method of claim 1, wherein the ongoing session towards the second user comprises media of the first session and the merging adds media of second session into the ongoing session.

7. The method of claim 4, wherein the re-negotiation of the ongoing session comprises transmitting a re-INVITE or an UPDATE request of session initiation protocol.

8. The method of claim 1, wherein the communication service identifier comprises an internet protocol multimedia system application reference identifier.

9. The method of claim 1, wherein the communication service identifier comprises an Open Mobile Alliance feature tag.

10. The method of claim 8, further comprising determining that the IMS Communication Service Identifier is indicating internet protocol multimedia system multimedia telephony service.

11. The method of claim 1, wherein the first session and the second session are carrying different media types.

12. The method of claim 11, wherein the media types are selected from speech, video, instant messaging, push-to-talk, file transfer and image sharing.

13. A memory embodying a computer program product, the computer program product executable by a processor to perform the method of claim 1.

14. The method of claim 1, where the network entity comprises one of a user equipment and a server.

15. An apparatus comprising:
at least one processor; and at least one memory including computer program code, where the at least one memory and the computer program code are configured, with the at least one processor, to cause the apparatus to at least:

control, with a network entity, communication of a first user, the communication comprising a first session and a second session;

determining if communication service identifiers comprising an internet protocol multimedia subsystem communication service identifier are indicated for the first session and for the second session, wherein, if the internet protocol multimedia subsystem communication service identifiers for the first session and the second session match, merging the first session and the second session into an ongoing session towards a second user.

16. The apparatus of claim 15, wherein controlling the communication of the first user comprises using session initiation protocol.

17. The apparatus of claim 15, wherein the single session towards the second user is controlled using session initiation protocol.

18. The apparatus of claim 15, wherein the merging the first session and the second session comprises re-negotiating the ongoing session.

19. The apparatus of claim 15, wherein the at least one memory including the computer program code is configured with the at least one processor to cause the apparatus to determine, during establishment of the second session, existence of the ongoing session of the first user towards the second user, and wherein the merging comprises merging the second session into the ongoing session in response to the establishment of the second session.

20. The apparatus of claim 15, wherein the ongoing session towards the second user comprises media of the first session and the merging adds media of second session into the ongoing session.

21. The apparatus of claim 18, wherein the re-negotiation of the ongoing session comprises transmitting a re-INVITE or an UPDATE request of session initiation protocol.

22. The apparatus of claim 15, wherein the communication service identifier comprises an internet protocol multimedia system application reference identifier.

23. The apparatus of claim 15, wherein the communication service identifier comprises an Open Mobile Alliance feature tag.

24. The apparatus of claim 22, further comprising determining that the internet protocol multimedia system communication service identifier is indicating internet protocol multimedia system multimedia telephony service.

25. The apparatus of claim 15, wherein the first session and the second session are carrying different media types.

26. The apparatus of claim 25, wherein the media types are selected from speech, video, instant messaging, push-to-talk, file transfer and image sharing.

27. The apparatus of claim 15, where the apparatus comprises one of a user equipment and a server.

* * * * *